No. 613,035.  
Patented Oct. 25, 1898.
H. L. HANNAFORD.
NUT LOCK.
(Application filed Apr. 6, 1898.)
(No Model.)
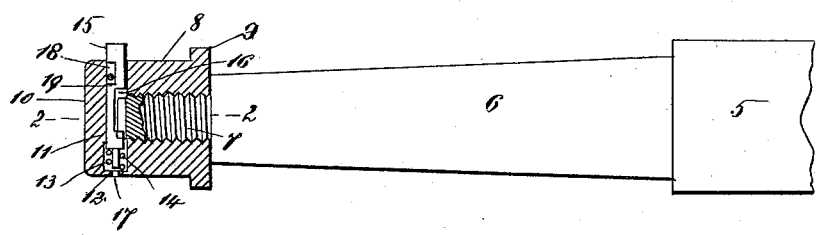
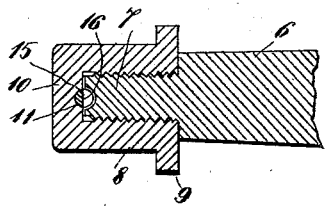
WITNESS
INVENTOR  
Harry L. Hannaford,  
BY  
Edgar Tate & Co  
ATTORNEYS

UNITED STATES PATENT OFFICE.

HARRY LEON HANNAFORD, OF DANIELSON, CONNECTICUT.

NUT-LOCK.

SPECIFICATION forming part of Letters Patent No. 613,035, dated October 25, 1898.

Application filed April 6, 1898. Serial No. 676,620. (No model.)

*To all whom it may concern:*

Be it known that I, HARRY LEON HANNAFORD, a citizen of the United States, residing at Danielson, in the county of Windham and State of Connecticut, have invented certain new and useful Improvements in Nut-Locks, of which the following is a full and complete specification, such as will enable those skilled in the art to which it appertains to make and use the same.

This invention relates to nut-locks for the spindles of vehicles; and the object thereof is to provide an improved device of this class which is simple in construction and operation and by means of which a spindle-nut may be secured or locked in position on the spindle.

The invention is fully disclosed in the following specification, of which the accompanying drawings form a part, in which the separate parts of my improvement are designated by the same numerals of reference in each of the views, and in which—

Figure 1 is a side view of the spindle of a vehicle and showing my improved nut-lock in section, and Fig. 2 a section of the end of the spindle and the nut at right angles to that shown in Fig. 1 or upon the lines 2 2 thereof.

In the drawings, forming part of this specification I have shown at 5 one of the axles of a vehicle which is provided with the usual spindle 6, on which is formed a reduced screw-threaded extension 7, and in the practice of my invention I provide a nut 8, which is provided with a flange or rim 9 and a screw-threaded central longitudinal bore.

The nut 8 is adapted to be screwed onto the screw-threaded extension 7 of the spindle in the usual manner, and the outer end is closed, as shown at 10, and formed transversely thereof is a bore 11, one end of which is closed, as shown at 12, and the inner end of the said bore is preferably slightly enlarged, as shown at 13, and mounted therein is a spiral spring 14.

The central portion of the transverse bore 11 is formed partly in the nut 10 and partly in the end of the screw-threaded extension 7 of the spindle, as shown in Fig. 2, and said bore is circular in cross-section, and mounted therein is a bolt 15, which is cut away longitudinally on the side thereof adjacent to the end of the screw-threaded extension 7 of the spindle, so as to form a longitudinal recess 16, and the inner end of the bolt 15 bears on the spring 14, and said bolt is provided with a pin 17, which projects through the sides of the nut at the closed end of the bore 11.

The bolt 15 is provided with a short longitudinal recess 18 in the side thereof opposite the recess 16, and near the outer end thereof and passing transversely through the side of the nut opposite the spring 14 and through the bore 11 and through the oblong notch or recess 18 in the bolt 15 is a pin 19, and the object of this pin is to prevent the bolt from being drawn out of the bore 11, in which it is placed, while allowing it to move freely therein within certain limits.

The bolt 15 is cylindrical in form, and the operation will be readily understood from the foregoing description when taken in connection with the accompanying drawings and the following statement thereof. By pressing the outer end of the bolt 15 inwardly the nut may be screwed on the spindle, as shown in the drawings, and then by releasing said bolt or removing the pressure from the outer end thereof it will be forced outwardly into position, as shown in Fig. 1, and the inner end thereof will engage with the end of the screw-threaded extension 7 of the spindle 6, and said nut will be locked in position and cannot turn on the spindle. By pressing the bolt 15 inwardly, however, the nut may be unscrewed or detached from the spindle, and it will thus be seen that I accomplish the object of my invention by means of a device which is simple in construction and operation and well adapted to produce the result for which it is intended.

My improved nut-lock is adapted for use in many different positions and may be employed in connection with rods or bolts wherever such devices are required, as well as on the spindle of the vehicle.

Having fully described my invention, I claim as new and desire to secure by Letters Patent—

1. The combination with a screw-threaded rod, bolt or spindle of a nut which is adapted to be mounted thereon, and the end of said rod, bolt or spindle and said nut being provided with a transverse bore which opens at one side of said nut, a spring-operated bolt which is mounted in said chamber and the side of which adjacent to the spindle is cut away longitudinally for a portion of its length and means for preventing the removal of the bolt from the nut, substantially as shown and described.

2. The combination with a screw-threaded rod, bolt or spindle, of a nut which is adapted to be mounted thereon, the end of the said rod, bolt or spindle, and said nut being provided with a transverse bore which opens at one side of said nut, a spring-operated bolt which is mounted in said chamber, and the side of which adjacent to the spindle is cut away longitudinally for a portion of its length and means for preventing the removal of the bolt from the nut, consisting of a pin which is passed through one side of the nut and through a longitudinal recess formed in one side of said bolt, substantially as shown and described.

In testimony that I claim the foregoing as my invention I have signed my name, in presence of the subscribing witnesses, this 7th day of May, 1897.

HARRY LEON HANNAFORD.

Witnesses:
   FREDK. A. KENNEDY,
   WM. H. PUTNAM.